United States Patent [19]
Larson

[11] Patent Number: 5,818,490
[45] Date of Patent: Oct. 6, 1998

[54] APPARATUS AND METHOD USING VARIABLE CONTROL SIGNALS TO IMPROVE THE PRINT QUALITY OF AN IMAGE RECORDING APPARATUS

[75] Inventor: Ove Larson, Västra Frölunda, Sweden

[73] Assignee: Array Printers AB, Sweden

[21] Appl. No.: 647,433

[22] Filed: May 2, 1996

[51] Int. Cl.[6] .............................. B41J 2/39; B41J 2/395; B41J 2/40
[52] U.S. Cl. ............................................ 347/151
[58] Field of Search ................................. 347/130, 247, 347/123, 129, 139, 151, 257; 399/291, 285

[56] References Cited

U.S. PATENT DOCUMENTS

| | | |
|---|---|---|
| 3,566,786 | 3/1971 | Kaufer et al. . |
| 3,689,935 | 9/1972 | Pressman et al. . |
| 3,779,166 | 12/1973 | Pressman et al. . |
| 4,263,601 | 4/1981 | Nishimura et al. . |
| 4,274,100 | 6/1981 | Pond . |
| 4,353,080 | 10/1982 | Cross . |
| 4,384,296 | 5/1983 | Torpey . |
| 4,386,358 | 5/1983 | Fischbeck . |
| 4,470,056 | 9/1984 | Galetto et al. . |
| 4,478,510 | 10/1984 | Fujii et al. . |
| 4,491,794 | 1/1985 | Daley et al. . |
| 4,491,855 | 1/1985 | Fujii et al. . |
| 4,498,090 | 2/1985 | Honda et al. . |
| 4,511,907 | 4/1985 | Fukuchi . |
| 4,525,708 | 6/1985 | Hareng et al. . |

(List continued on next page.)

FOREIGN PATENT DOCUMENTS

| | | |
|---|---|---|
| 12 70 856 | 6/1968 | Germany . |
| 26 53 048 | 5/1978 | Germany . |
| 4426333 | 11/1969 | Japan . |
| 55-55878 | 4/1980 | Japan . |
| 55-84671 | 6/1980 | Japan . |
| 58-044457 | 3/1983 | Japan . |
| 62-13356 | 11/1987 | Japan . |
| 63-29795 | 5/1990 | Japan . |
| 04189554 | 8/1992 | Japan . |
| 5208518 | 8/1993 | Japan . |
| 93331532 | 12/1993 | Japan . |
| 94200563 | 8/1994 | Japan . |
| 9048151 | 2/1997 | Japan . |
| 9118036 | 5/1997 | Japan . |
| 2108432 | 5/1983 | United Kingdom . |
| 9014960 | 12/1990 | WIPO . |

OTHER PUBLICATIONS

E. Bassous, et al., "The Fabrication of High Precision Nozzles by the Anisotropic Etching of (100) Silicon", *J. Electrochem. Soc.: Solid–State Science and Technology*, vol. 125, No. 8, Aug. 1978, pp. 1321–1327.

Jerome Johnson, "An Etched Circuit Aperture Array for TonerJet® Printing", *IS&T's Tenth International Congress on Advances in Non–Impact Printing Technologies*, 1994, pp. 311–313.

"The Bst of Both Worlds," Brochure of Toner Jet® by Array Printers, *The Best of Both Worlds*, 1990.

*Primary Examiner*—Mark J. Reinhart
*Assistant Examiner*—L. Anderson
*Attorney, Agent, or Firm*—Knobbe, Martens Olson & Bear, LLP

[57] ABSTRACT

The present invention relates to a method for improving the print quality of an image recording apparatus in which charged particles are transported from a particle source and deposited in an image configuration on an information carrier. Variable control voltages are supplied to control electrodes to permit or restrict the transport of charged particles from the particle source during a predetermined print time. The control voltage levels, the print time length or the voltage levels and the print time length are dimensioned in relation to the specific distance between each control electrode and the particle source. The present invention relates also to a device for accomplishing the method.

25 Claims, 12 Drawing Sheets

U.S. PATENT DOCUMENTS

| | | |
|---|---|---|
| 4,525,727 | 6/1985 | Kohashi et al. . |
| 4,571,601 | 2/1986 | Teshima . |
| 4,675,703 | 6/1987 | Fotland . |
| 4,717,926 | 1/1988 | Hotomi . |
| 4,743,926 | 5/1988 | Schmidlin et al. . |
| 4,748,453 | 5/1988 | Lin et al. . |
| 4,814,796 | 3/1989 | Schmidlin . |
| 4,831,394 | 5/1989 | Ochiai et al. . |
| 4,837,071 | 6/1989 | Tagoku et al. . |
| 4,860,036 | 8/1989 | Schmidlin . |
| 4,912,489 | 3/1990 | Schmidlin . |
| 4,922,242 | 5/1990 | Parker . |
| 5,028,812 | 7/1991 | Bartky . |
| 5,036,341 | 7/1991 | Larsson . |
| 5,038,159 | 8/1991 | Schmidlin et al. . |
| 5,057,855 | 10/1991 | Damouth . |
| 5,072,235 | 12/1991 | Slowik et al. . |
| 5,083,137 | 1/1992 | Badyal et al. . |
| 5,121,144 | 6/1992 | Larson et al. . |
| 5,128,695 | 7/1992 | Maeda . |
| 5,148,595 | 9/1992 | Doggett et al. . |
| 5,170,185 | 12/1992 | Takemura et al. . |
| 5,181,050 | 1/1993 | Bibl et al. . |
| 5,204,696 | 4/1993 | Schmidlin et al. . |
| 5,204,697 | 4/1993 | Schmidlin . |
| 5,214,451 | 5/1993 | Schmidlin et al. . |
| 5,229,794 | 7/1993 | Honman et al. . |
| 5,237,346 | 8/1993 | Da Costa et al. . |
| 5,256,246 | 10/1993 | Kitamura . |
| 5,257,045 | 10/1993 | Bergen et al. . |
| 5,270,729 | 12/1993 | Stearns . |
| 5,274,401 | 12/1993 | Doggett et al. . |
| 5,307,092 | 4/1994 | Larson . |
| 5,402,158 | 3/1995 | Larson . |
| 5,450,115 | 9/1995 | Bergen et al. . |
| 5,473,352 | 12/1995 | Ishida . |
| 5,477,246 | 12/1995 | Hirabayashi et al. . |
| 5,506,666 | 4/1996 | Masuda et al. . |
| 5,515,084 | 5/1996 | Larson . |
| 5,617,129 | 4/1997 | Chizuk, Jr. et al. . |
| 5,625,392 | 4/1997 | Maeda . |
| 5,640,185 | 6/1997 | Kagayama . |
| 5,650,809 | 7/1997 | Kitamura . |
| 5,666,147 | 9/1997 | Larson . |

APPARATUS AND METHOD USING VARIABLE CONTROL SIGNALS TO IMPROVE THE PRINT QUALITY OF AN IMAGE RECORDING APPARATUS

BACKGROUND OF THE INVENTION

1. Field of the Invention

The present invention relates to image recording methods and devices and, more particularly, to a method for improving the print quality of direct printing devices, in which a visible image pattern is formed by conveying charged toner particles from a toner carrier through a control array directly onto an information carrier. The present invention relates also to a device for accomplishing the method.

2. Description of the Related Art

The most familiar and widely utilized electrostatic printing technique is that of xerography wherein latent electrostatic images formed on a charge retentive surface, such as a roller, are developed by suitable toner material to render the images visible, the images being subsequently transferred to an information carrier. This process is called an indirect process because it first forms a visible image on an intermediate surface and then transfers that image to an information carrier.

Another method of electrostatic printing is one that has come to be known as direct electrostatic printing. This method differs from the aforementioned xerographic method in that charged pigment particles (referred to herein as toner) are deposited directly onto an information carrier to form a visible image. In general, this method includes the use of electrostatic fields controlled by addressable electrodes for allowing passage of toner particles through selected apertures in a printhead structure. A separate electrostatic field is provided to attract the toner particles to an information carrier in image configuration.

The novel feature of direct electrostatic printing is its simplicity of simultaneous field imaging and particle transport to produce a visible image on the information carrier directly from computer generated signals, without the need for those signals to be intermediately converted to another form of energy such as light energy, as is required in electrophotographic printers, e.g., laser printers.

U.S. Pat. No. 5,036,341, granted to Larsson, discloses a direct printing method which begins with a stream of electronic signals defining the image information. A uniform electric field is created between a high potential on a back electrode and a low potential on a particle carrier. That uniform field is modified by potentials on selectable wires in a two dimensional wire mesh array placed in the print zone. The wire mesh array consists of parallel control wires, each of which is connected to an individual voltage source, across the width of the information carrier. However, a control electrode array may take on many designs. Generally, the array is a thin sheet-like element comprising a plurality of addressable control electrodes and corresponding voltage signal sources connected thereto.

For example, the control electrode array may be constructed of a flexible, non-rigid material and overlaid with a printed circuit such that apertures in the material are arranged in rows and columns and are surrounded by electrodes. An electrostatic field on the back electrode attracts the toner particles from the surface of the particle carrier to create a particle stream toward the back electrode. The particle stream is modulated by voltage sources which apply an electric potential to selected individual control electrodes to produce electrostatic fields which permit or restrict particle transport from the particle carrier through the corresponding aperture. The modulated stream of charged particles allowed to pass through selected apertures impinge upon an information carrier interposed in the particle stream to provide line-by-line scan printing to form a visible image.

The control electrodes are aligned in several transverse rows extending parallel to the motion of the information carrier. All control electrodes are initially at a white potential $V_w$ preventing all toner transport from the particle carrier. As image locations on the information carrier pass beneath apertures, corresponding control electrodes are set to a black potential $V_b$ to produce an electrostatic field drawing the toner particles from the particle carrier. The toner particles are pulled through the apertures and deposited on the information carrier in the configuration of the desired image pattern. The toner particle image is then made permanent by heat and pressure fusing the toner particles to the surface of the information carrier.

Accordingly, variable electric forces act either attracting or repelling on the toner particles positioned on the surface of the particle carrier, during a predetermined print time. Those electric forces must be chosen to be above or below a transport threshold value for print or no print respectively. That threshold value is strongly depending on the distance between the actual control electrode and the surface of the particle carrier. This distance is referred to herein as the gap distance.

Further, during print condition, the attractive force must not be changed until the particles have sufficient momentum to pass through the aperture. The time required for particles to be transported past an aperture, referred to herein as the print time, also depends on the gap distance.

However, a drawback of the aforementioned method is that the value of the print voltage $V_b$, and the length of the print time $t_b$ are constant for each aperture throughout the whole array surface, no account being taken on the specific location of the aperture with respect to the particle carrier surface.

Therefore, any variation of the gap distance may significantly modify the print control function, resulting in undesired size variation of the printed dots and a degradation of print readability.

SUMMARY OF THE INVENTION

Applicant has perceived a need to improve the print quality of direct printing methods by enhancing grey scale capability. In that case, the image configuration is formed of dots having variable form, a variable darkness or both to create different shades comprised between white and maximal darkness. To improve grey scale capability, the control voltages or the time during which those control voltages are applied, can be modulated to influence different amounts of toner particles, each amount corresponding to a specific grey level. A direct printing method with satisfactory grey scale capability requires an improved accuracy of the control function. Thus, it is an imperative necessity to eliminate or at least considerably reduce the effects of undesired variations of the gap distance.

However, since the control array is set as close to the surface of the particle carrier as possible without contacting the toner layer, the gap distance being typically in the order of 50 microns, even the slightest mechanical imperfections can result in a drastic degradation of print quality.

In practice, the particle carrier may be a sleeve having a form which is neither perfectly cylindrical nor perfectly smooth. That sleeve may be coated with a particle layer whose thickness is not perfectly uniform. Further, the array may have various surface imperfections and the particles themselves may vary in their diameter and degree of sphericity. This is only a few examples of numerous irregularities which may cause variations in the actual gap distance. Variations of the gap distance may also be caused by the geometrical configuration of the print zone.

For instance, the distance between a plane array and a cylindrical sleeve obviously varies due to the curvature of the sleeve. That dimensional variation, referred to herein as curvature variation, results in that a given control voltage will influence different amounts of particles depending on whether it is applied on a control electrode located near to the sleeve surface or to a control electrode located farther from the sleeve surface. As a result, the printed dots of the image will vary in their size, their darkness or their size and darkness, degrading the print readability.

Therefore, to insure a uniform print performance, notwithstanding the relative position of the control electrodes and the sleeve surface, it is essential to adjust each control voltage to the specific location of the control electrodes to which it is supplied.

Hence, there is still a need for a method to enhance the print quality of direct printing method and apparatus by neutralizing the effects of the aforementioned curvature variation.

The present invention satisfies a need for higher quality printing, by improving a direct printing method, in which each control signal can be modified in relation to the specific location of the control electrode to which the control signal is supplied.

The present invention relates to a method in which the print time, during which each control signal is supplied to a particular control electrode, the voltage level corresponding to the control signal, or the print time and the voltage level can be modified in relation to the gap distance between the particular control electrode and the surface of the particle carrier.

The present invention also concerns any combination of the aforementioned voltage level and print time corrections.

Further, the present invention relates to a method wherein consecutive print sequences are performed, during which the control signals are supplied to all control electrodes located at a same, predetermined distance from the surface of the particle carrier, while all remaining control electrodes are given a screen potential to prevent electrostatic interaction between adjacent control signals. In that case, each of the print sequences is associated with a specific set of voltage levels, print time length or voltage levels and print time length.

Finally, the present invention refers to a device for accomplishing the aforementioned method.

According to a preferred embodiment of the present invention, the particle carrier consists of at least one rotating developer sleeve coated with a thin layer of charged particles. The sleeve is preferably cylindrical, with a rotation axis extending perpendicular to the motion of the information carrier.

According to the preferred embodiment of the present invention, the control array is preferably formed of a flexible, non-rigid electrically insulating substrate having a plurality of apertures arranged therethrough in parallel rows, each aperture being at least partially surrounded by a ring-shaped control electrode, etched on a surface of the substrate, and individually connected to a control voltage source, which supply control signals, defining the image information, to the associated control electrode.

According to the preferred embodiment of the present invention, the transverse axis of the control array coincides with an orthogonal projection of the rotation axis of the sleeve onto the array. The rows of apertures are symmetrically disposed on both sides of the transverse axis of the array, whereby the apertures of each pair of rows are similarly spaced from the sleeve surface. Each control voltage source supplies control signals to its associated control electrode during a specific print time. Each control signal has a voltage level, a specific print time, or a voltage level and specific print time which are corrected to correspond to the specific location of the particular row to which the signal is supplied. The voltage level, the specific print time or the voltage level and specific print time are functions of the distance between the actual row and the sleeve surface.

Although it is convenient to align the apertures in parallel transverse rows across the width of the array surface, the present invention is neither limited to a particular configuration of the control array nor to any other design aspect. In fact, the amount of toner particles passing through each single aperture can be individually controlled by modulating the width, the intensity or both width and intensity of the signal pulse, thereby taking account of the specific location of the single aperture. Similarly, the signal pulse can be modulated in relation to the row position, or the position of any other subset of apertures, depending on the design and the relative disposition of the control array and the developer sleeve.

BRIEF DESCRIPTION OF THE DRAWINGS

FIG. 4a is a further enlargement of a part of FIG. 4 showing one aperture of the control array in more detail.

DETAILED DESCRIPTION OF THE PREFERRED EMBODIMENTS

Figure 1:
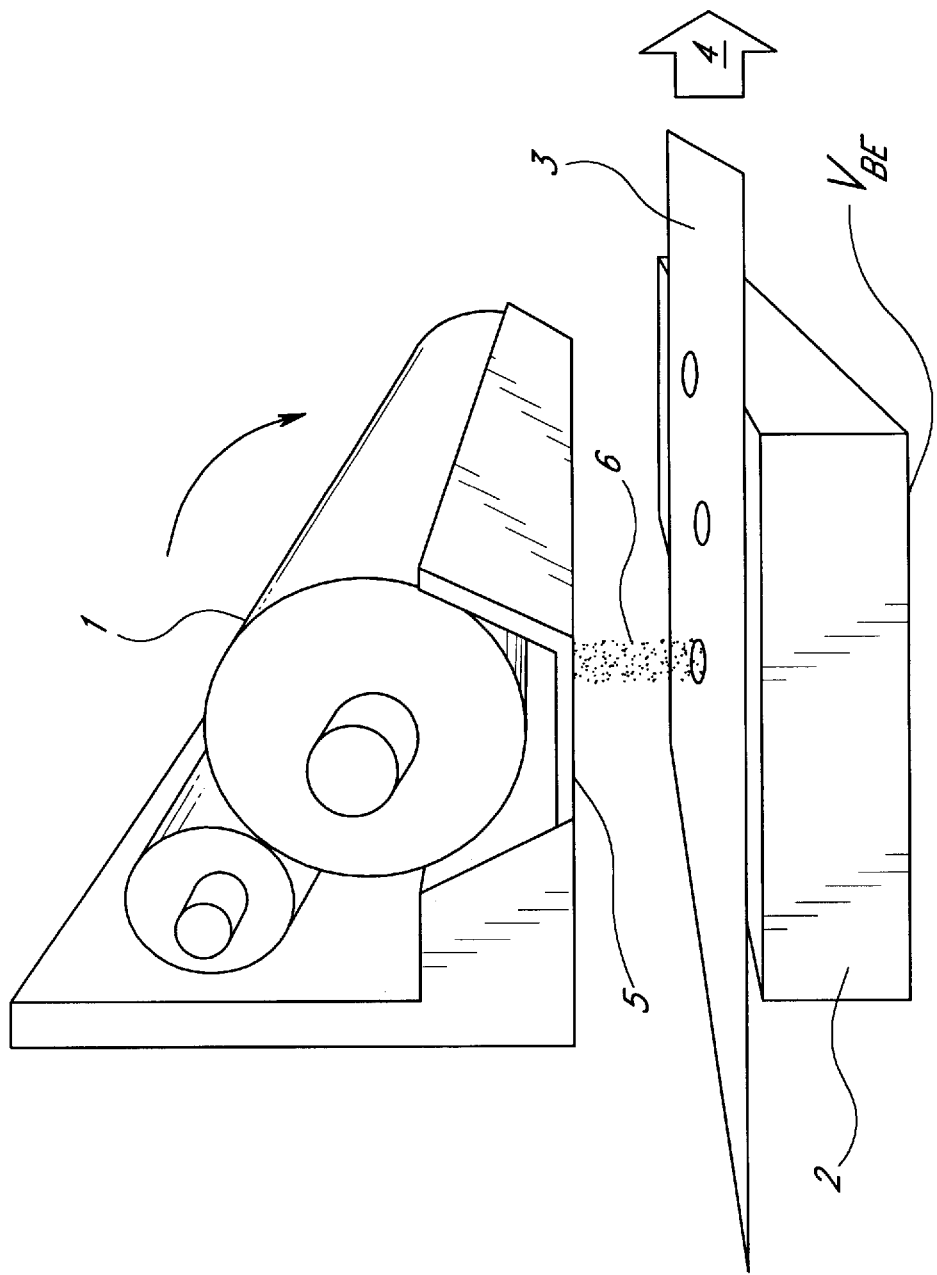
FIG. 1 is a schematic perspective view of a direct printing device for performing the method of the present invention.

FIG. 1 illustrates a print zone in a device for performing a direct printing method. The print zone includes a toner carrier 1, such as a rotating developer sleeve coated with a thin layer of uniformly charged toner particles, conveyed in a position adjacent to a back electrode 2 which is connected to a back electrode voltage source ($V_{BE}$). A uniform electric field is created between a high potential on the back electrode 2 and a low potential on the particle carrier 1 to apply attractive electric forces on the toner particles. A particle receiving information carrier 3, such as a plain surface of untreated paper is transferred across the print zone between the back electrode 2 and the particle carrier 1 in the direction of arrow 4. An array 5 of control electrodes, positioned between the particle carrier 1 and the information carrier 3, controls the stream of toner particles 6 transported toward the information carrier 3.

Figure 2:
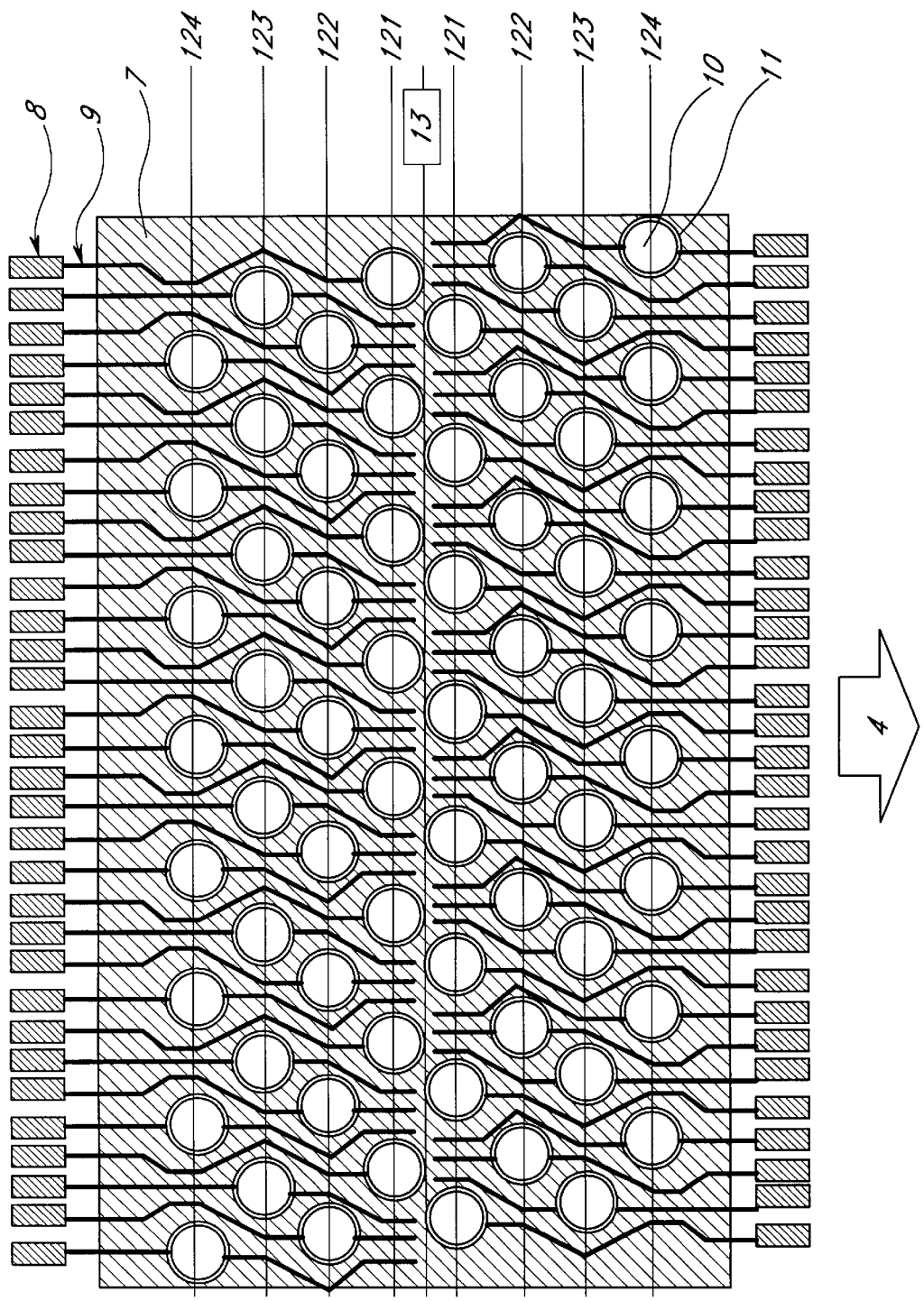
FIG. 2 is a plan view of the control array of a direct printing device according to a preferred embodiment of the invention.

FIG. 2 is a schematic plan view of an array 5 of control electrodes according to a preferred embodiment of the present invention.

The array 5 is formed of an electrically insulating substrate 7 of flexible, non-rigid material having a plurality of apertures 10 arranged therethrough, each of which is surrounded by a ring electrode 11. The apertures 10 are aligned in parallel rows 121, 122, 123, 124 and columns. The parallel rows 121, 122, 123, 124 extend transversely across the width of the print zone in a direction perpendicular to the motion of the information carrier. The columns are aligned at a slight angle to the motion of the information carrier to ensure complete coverage of the information carrier by providing at least one addressable dot position at every point across a line in a direction transverse to the movement of the information carrier.

The parallel rows 121, 122, 123, 124 of apertures 10 are arranged symmetrically on each side of a central transverse axis 13 of the array which axis 13 coincides with an orthogonal projection of the rotation axis of the particle carrying developer sleeve, and thus corresponds to a position nearest to the surface of the particle carrier.

The control voltage sources 8 are disposed on both sides of the central transverse axis 13 of the array. Each control voltage source 8 is joined to its associated ring electrode 11 through a conductor 9 extending substantially parallel to the motion of the information carrier. Each conductor 9 extends from a control voltage source 8 to the associated ring electrode 11 and is preferably lengthened from that ring electrode 11 to a position adjacent to the central transverse axis 13 of the array, so that an equal number of conductors 9 extend between every pair of adjacent ring electrodes 11 of each row 121, 122, 123, 124.

Figure 3:
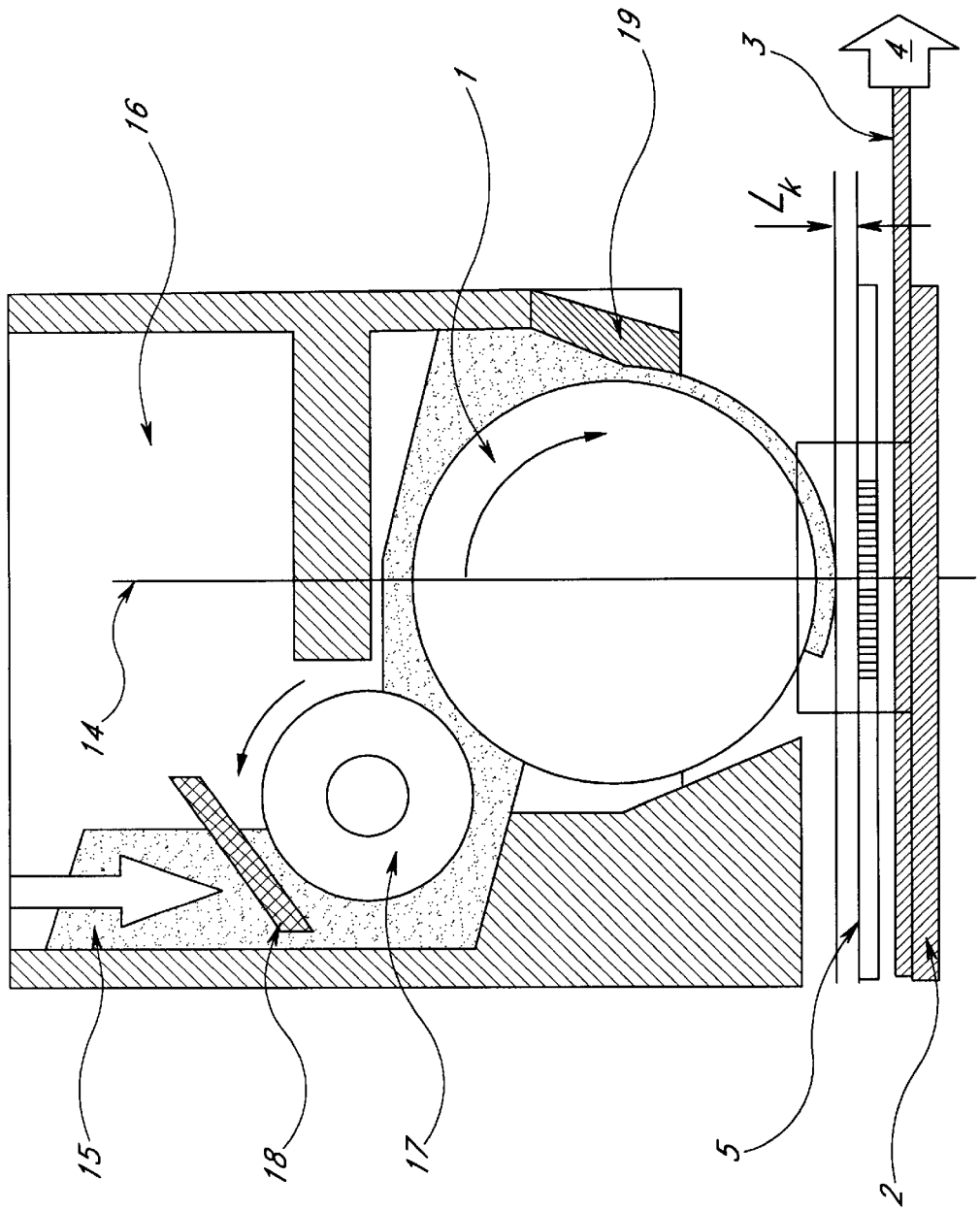
FIG. 3 is a cross section of a direct printing device.

FIG. 3 is a schematic cross section view of the print zone of a direct printing device according to the preferred embodiment of the present invention. Toner particles 15 are conveyed from a toner container 16 to the surface of the developer sleeve 1, by means of a supplying device 17, such as a rotating supply brush, a toner feeder 18 and a metering blade 19 that insure a uniform thickness of the toner layer on the sleeve surface. Toner particles 15 are preferably charged by contact with the fibrous material of the supply brush 17, by charge exchange with the surface material of the sleeve 1 or by any other suitable way. Toner particles 15 are conveyed on the sleeve surface to a position adjacent to a back electrode 2 corresponding to a central axis 14 of the print zone and positioned at a distance $L_k$ from the surface of the control array 5. A particle receiving information carrier 3 (e.g., a sheet of paper) is caused to move between the control array 5 and the back electrode 2 in the direction of the arrow 4.

Figure 4:
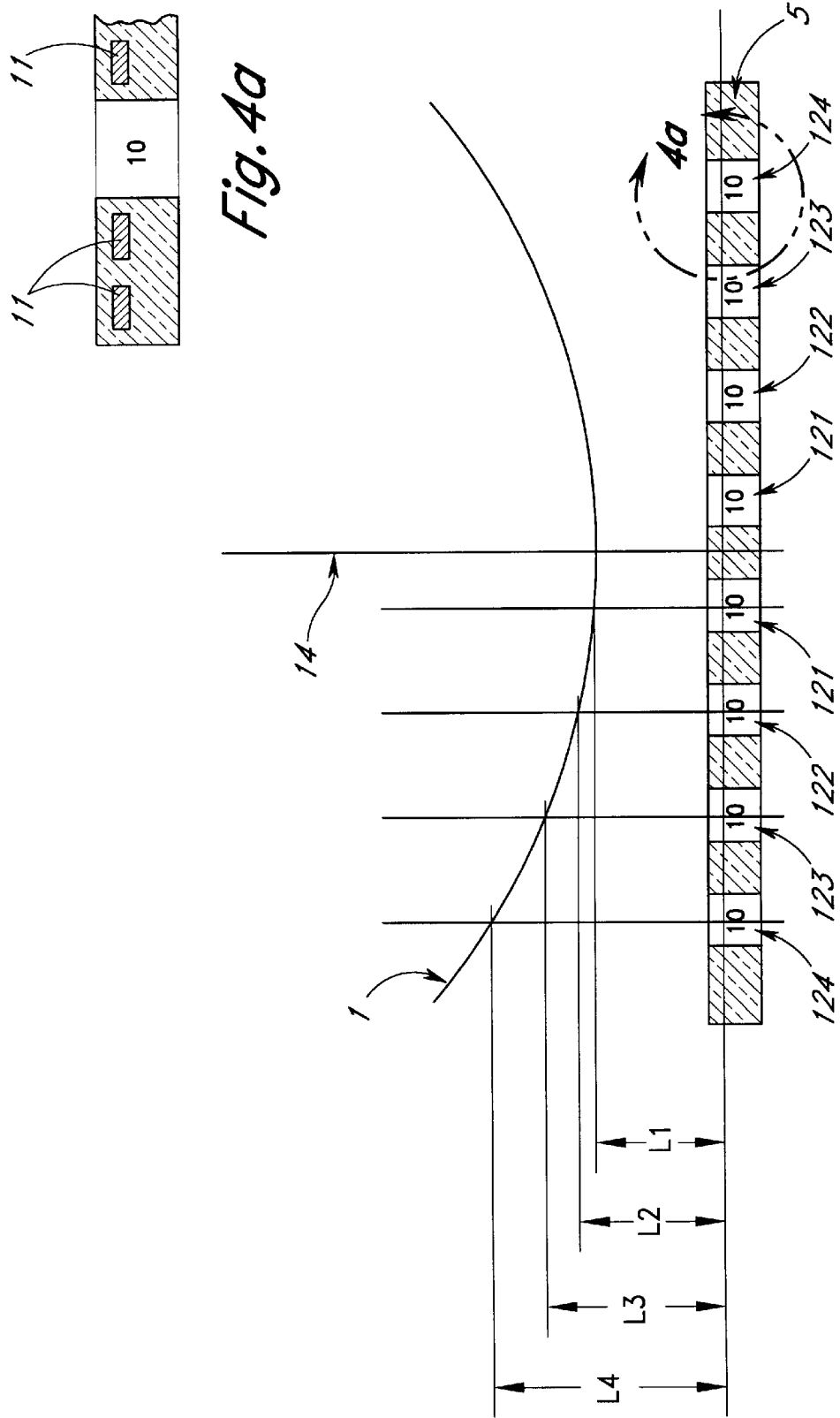
FIG. 4 is an enlargement of a part of FIG. 3, showing the print zone between the sleeve surface and the control array.

FIG. 4 is an enlargement of the print zone shown in FIG. 3, wherein the control array, similar to that of FIG. 2, is shown in cross-sectional view. FIG. 4a illustrates one of the apertures 10 and its surrounding electrode 11 in more detail. Four parallel rows 121, 122, 123, 124 of apertures 10 are symmetrically disposed on each side of a central axis 14 of the print zone passing through the center point of the sleeve 1. Each pair of rows 121, 122, 123, 124 is located at a specific distance L1, L2, L3, L4 respectively from the surface of the developer sleeve 1. As the toner particles are uniformly charged, the threshold field intensity E required to draw a toner particle from the sleeve surface is substantially constant at every point of the sleeve surface. Theoretically, an electrode located in a row 121, i.e., at a distance $L_1$, from the sleeve surface must be given a voltage $V_1 = E \times L_1$ to draw a toner particle from the sleeve surface. Similarly, electrodes located in rows 122, 123 and 124 must be given voltages $V_2 = E \times L_2$, $V_3 = E \times L_3$ and $V_4 = E \times L_4$, respectively.

Figure 5:
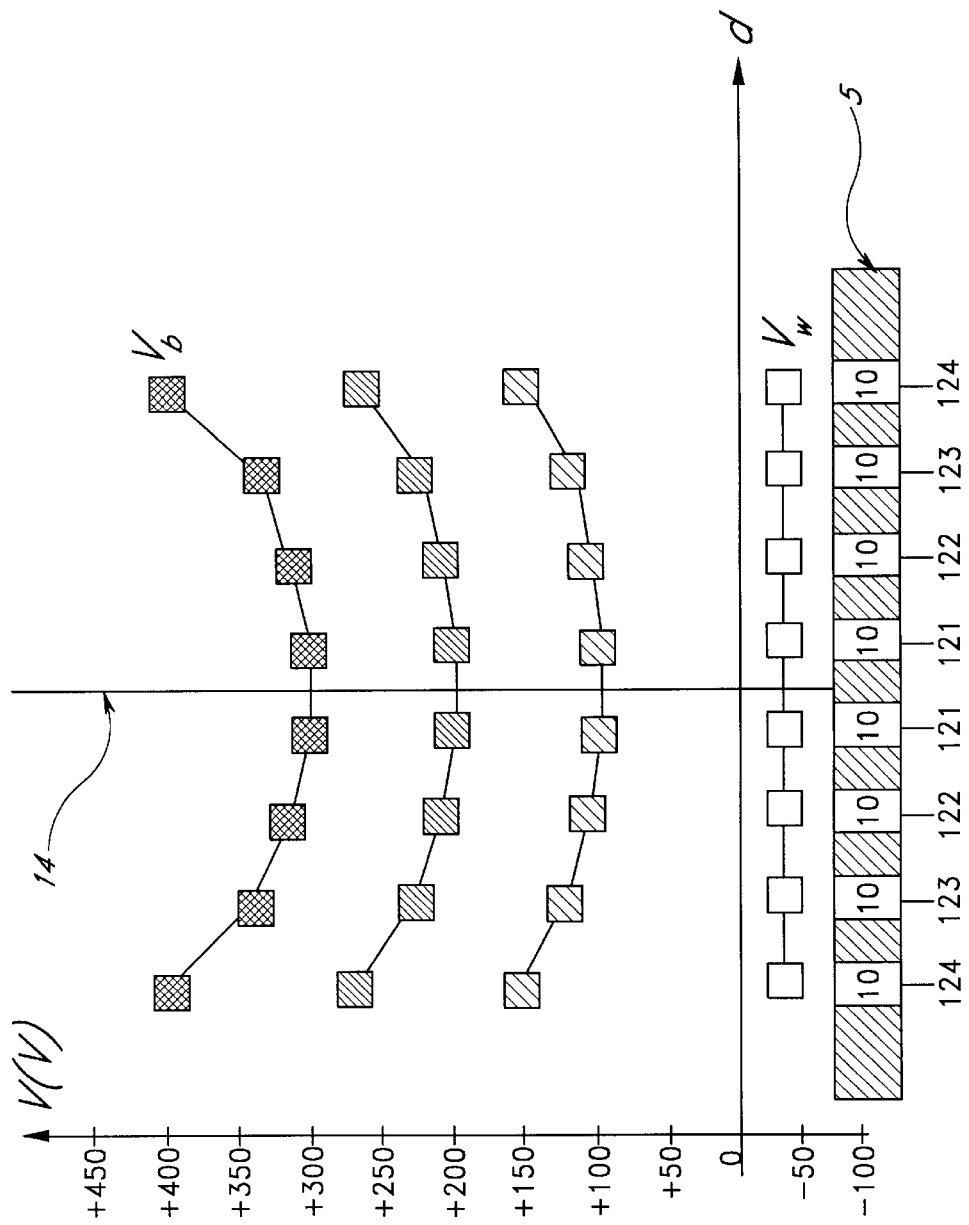
FIGS. 5, 6 and 7 are diagrams which illustrate the control voltage levels as a function of the position of the rows, according to different embodiments of the present invention.

FIG. 5 is a diagram illustrating a first example of the voltage modulation as a function of the position of the rows 121, 122, 123, 124. The horizontal axis determines location of the pairs of rows 121, 122, 123, 124 on each side of the array axis 14 in a direction parallel to the motion of the information carrier. The vertical axis determines the levels of the control voltages applied to the different rows 121, 122, 123, 124.

In the example shown in FIG. 5, the lowest (white) voltage Vw is chosen to be constant on every row, while the highest (black) voltage Vb increases with the distance d between a row and the array axis 14. A number of intermediate levels, each of which corresponds to a particular shade of grey are adjusted within the range $V_w$ to $V_b$. Although it is preferred to increase voltage levels proportionally to the distance d, any other function, e.g., a parabolic or exponential function, can be used to perform the method, depending on the print zone configuration.

As shown in FIG. 5, the contrast voltage, defined as the interval between the "black" voltage $V_b$ and the "white" voltage $V_w$, differs from a row to another, to compensate for the gap distance variation.

Figure 6:
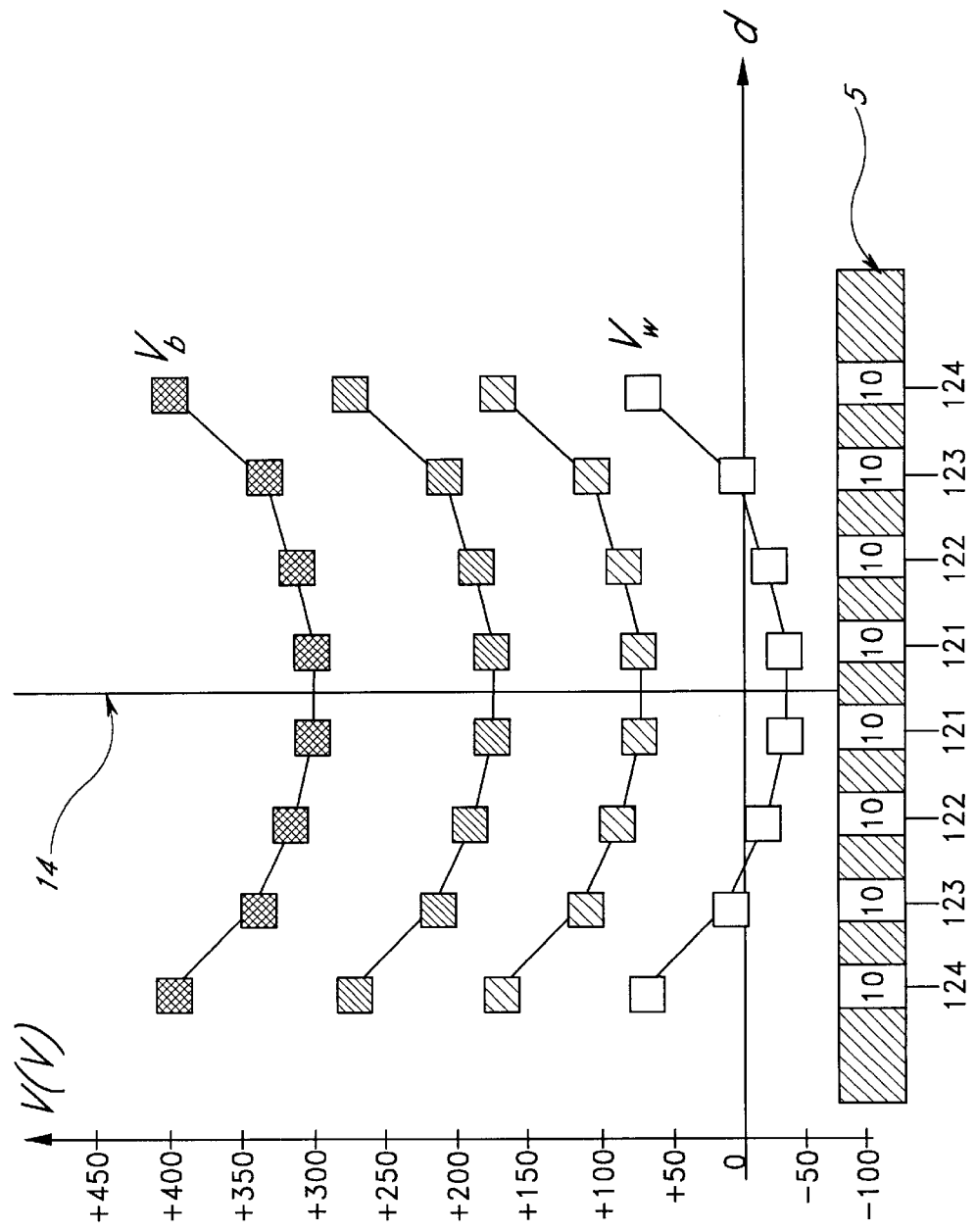

FIG. 6 shows a second example of the voltage modulation as a function of row location, wherein the contrast voltage is held substantially constant on the whole array, as all control voltage levels increase similarly as a function of the distance d.

Figure 7:
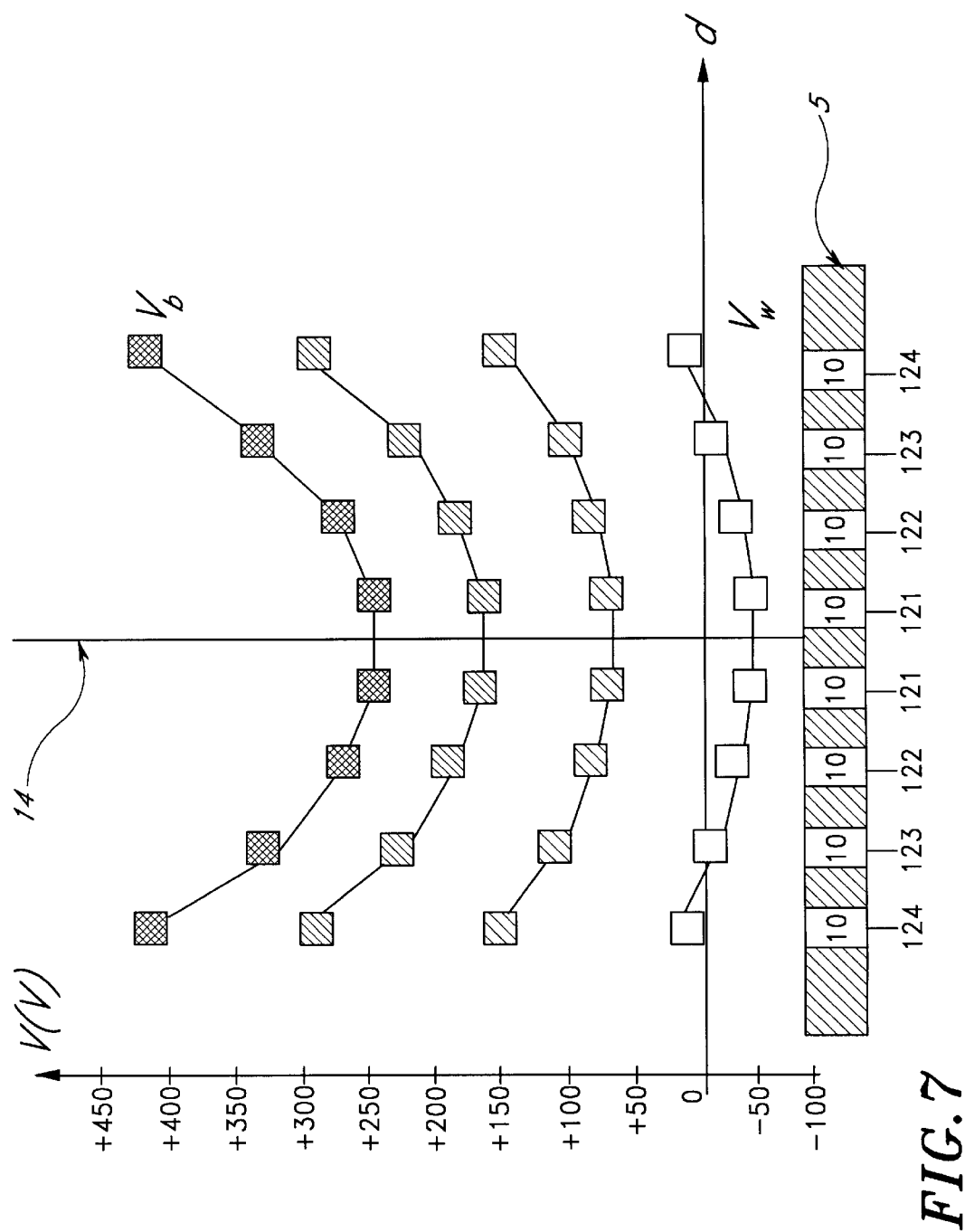

FIG. 7 shows a third example of the voltage modulation as a function of row location, wherein the highest and the lowest voltage levels, $V_b$ and $V_w$ respectively, increase at different rates, as functions of the distance d.

Those skilled in the art will recognize that the method can be performed using various number of grey levels, various number of rows or other voltage modulations than those described above.

Another important feature of the present invention is that the print time, i.e., the time needed for an appropriate amount of toner particles to be transported from the sleeve surface past an aperture 10, can be modulated to compensate for the gap distance variations. After passing through the aperture, the particles will be transported by the back electrode field even if the control electrode is set to a white voltage.

Figure 8:
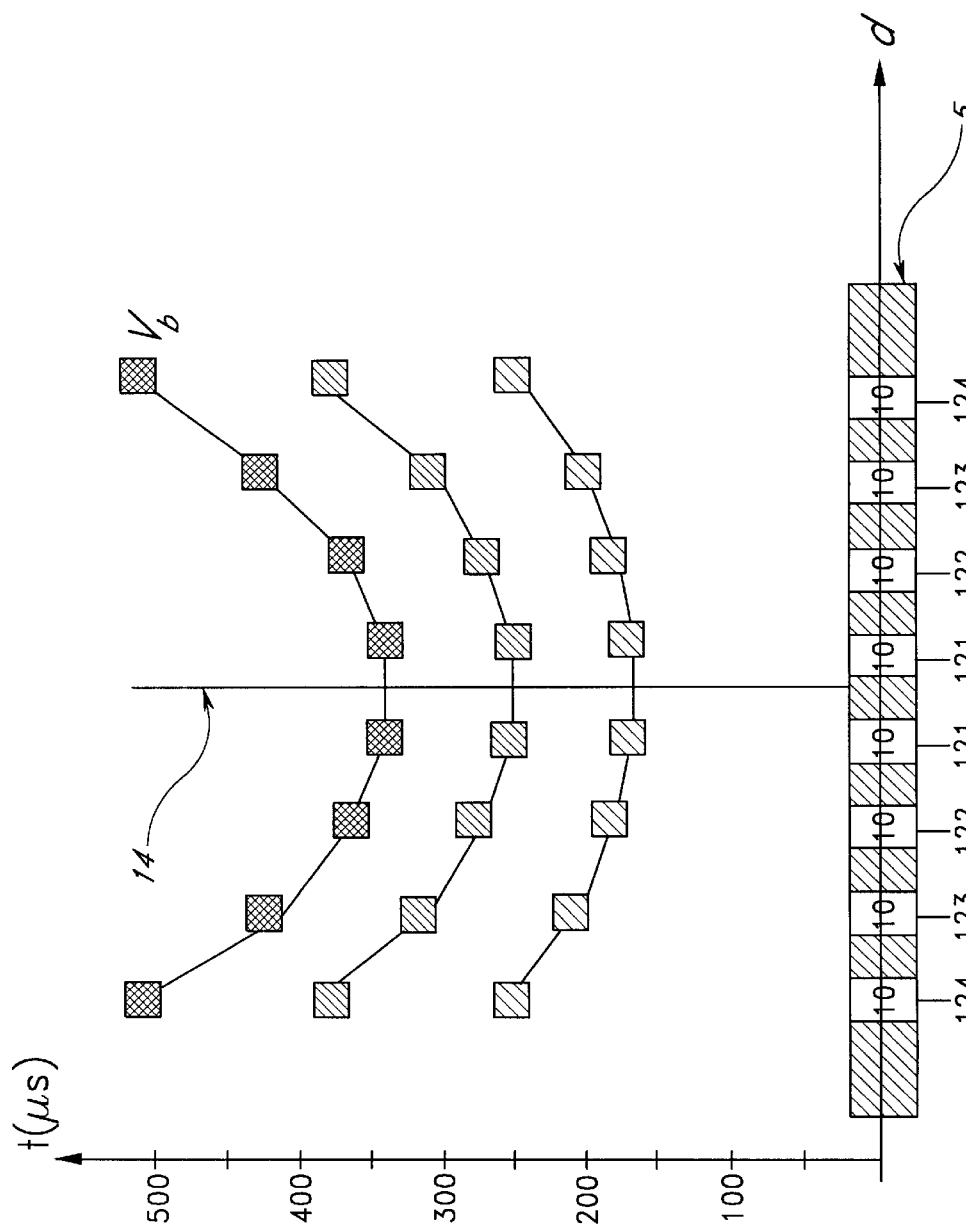
FIG. 8 is a diagram illustrating the print time levels as a function of the position of the rows, according to another embodiment of the present invention.

FIG. 8 illustrates an example of print time modulation as a function of the row location. The horizontal axis is the same as in FIGS. 5, 6 and 7, and the vertical axis determines the print time levels required for different shades of grey scale.

Another important feature of the present invention is that the aforementioned voltage modulation and print time modulation can be combined in various ways to improve the print quality and the grey scale capability.

Figure 9:
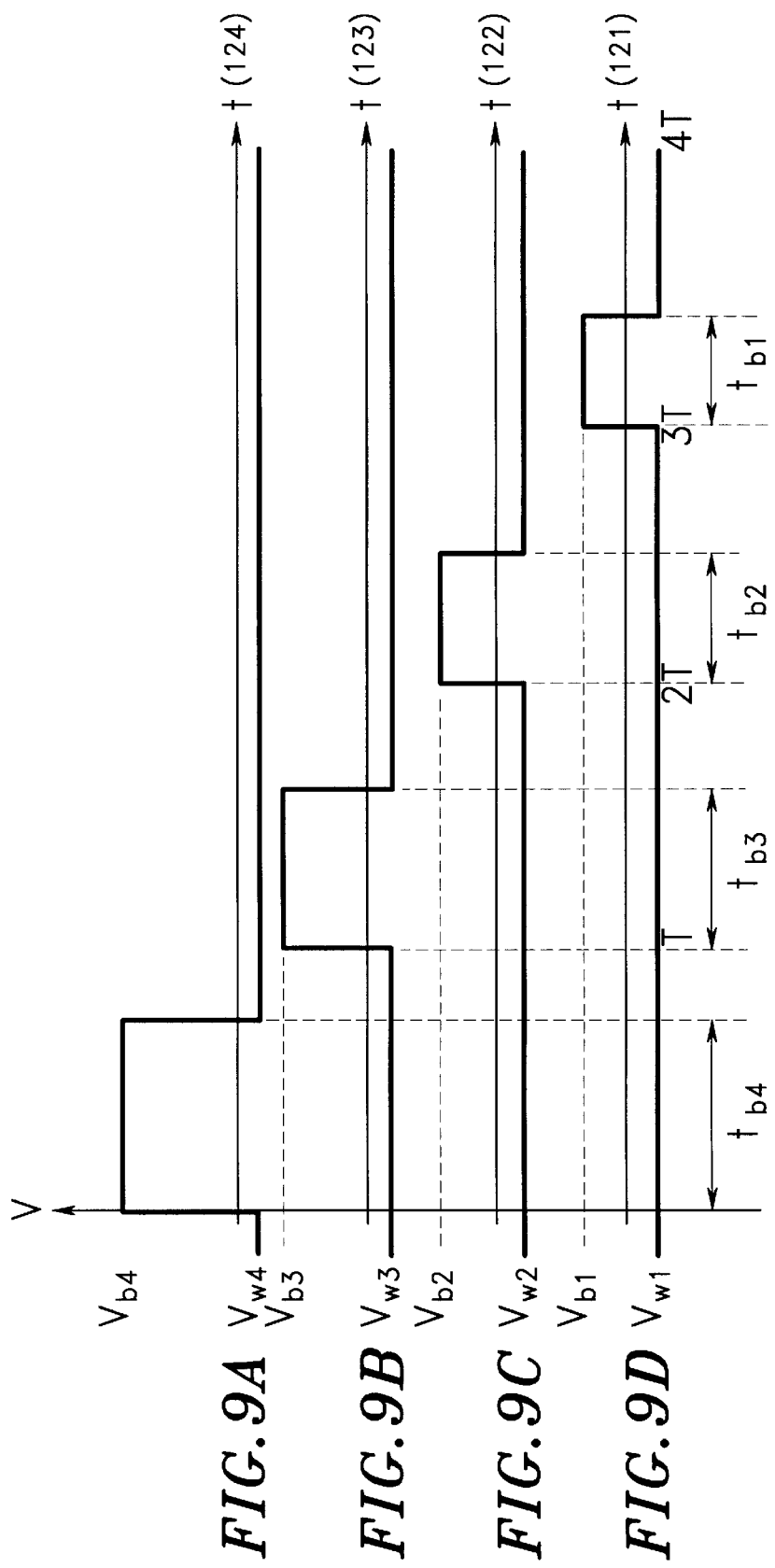
FIGS. 9a, 9b, 9c and 9d illustrates four voltage-time diagrams which illustrates an alternate embodiment of the invention.

According to an alternate embodiment of the present invention, illustrated in FIG. 9, the control signals are sequentially supplied to control electrodes of each pair of rows 121, 122, 123, 124. Printing is performed in consecutive print sequences during each of which a specific number of rows are activated.

For instance, control signals are first applied to the pair of rows 124 during a first print period (0 to T). Those control signals are chosen in relation to the gap distance $L_4$. The voltage levels associated to that first print sequence are within a range $V_{w4}$ to $V_{b4}$. The maximal print time, during which rows 124 are activated is set to $t_{b4}$. During the first print sequence (0 to T), the remaining rows 121, 122, 123 are given a screen voltage $V_s$ to electrostatically shield the active apertures against undesired interaction with adjacent rows. That screen voltage preferably corresponds to a "white voltage".

The procedure is then repeated during a second print sequence (T to 2T), activating the pair of rows 123, and dimensioning the voltage levels $V_{w3}$ to $V_{b3}$, and the maximal print time $t_{b3}$ in relation to the gap distance $L_3$.

As shown in FIGS. 9a, 9b, 9c and 9d control signals are consecutively applied to the control electrodes of each pair of similarly spaced rows 121, 122, 123, 124. As a particular pair of rows is activated, all electrodes of the remaining rows are set to a screen voltage, (or to a white voltage), so that only one pair of rows is active at the same time. The control voltages, the print time or both the control voltages and the print time are sequentially decreased for each print sequence. For example, the print time may range from 0 microseconds to 500 microseconds, and preferably ranges from 100 microseconds to 400 microseconds.

As shown in FIG. 9, each print sequence has an equal length T including a predetermined print time and a "white time", i.e., the time required for the rotating sleeve surface to carry new toner particles in a position adjacent to the actual aperture.

Figure 10:
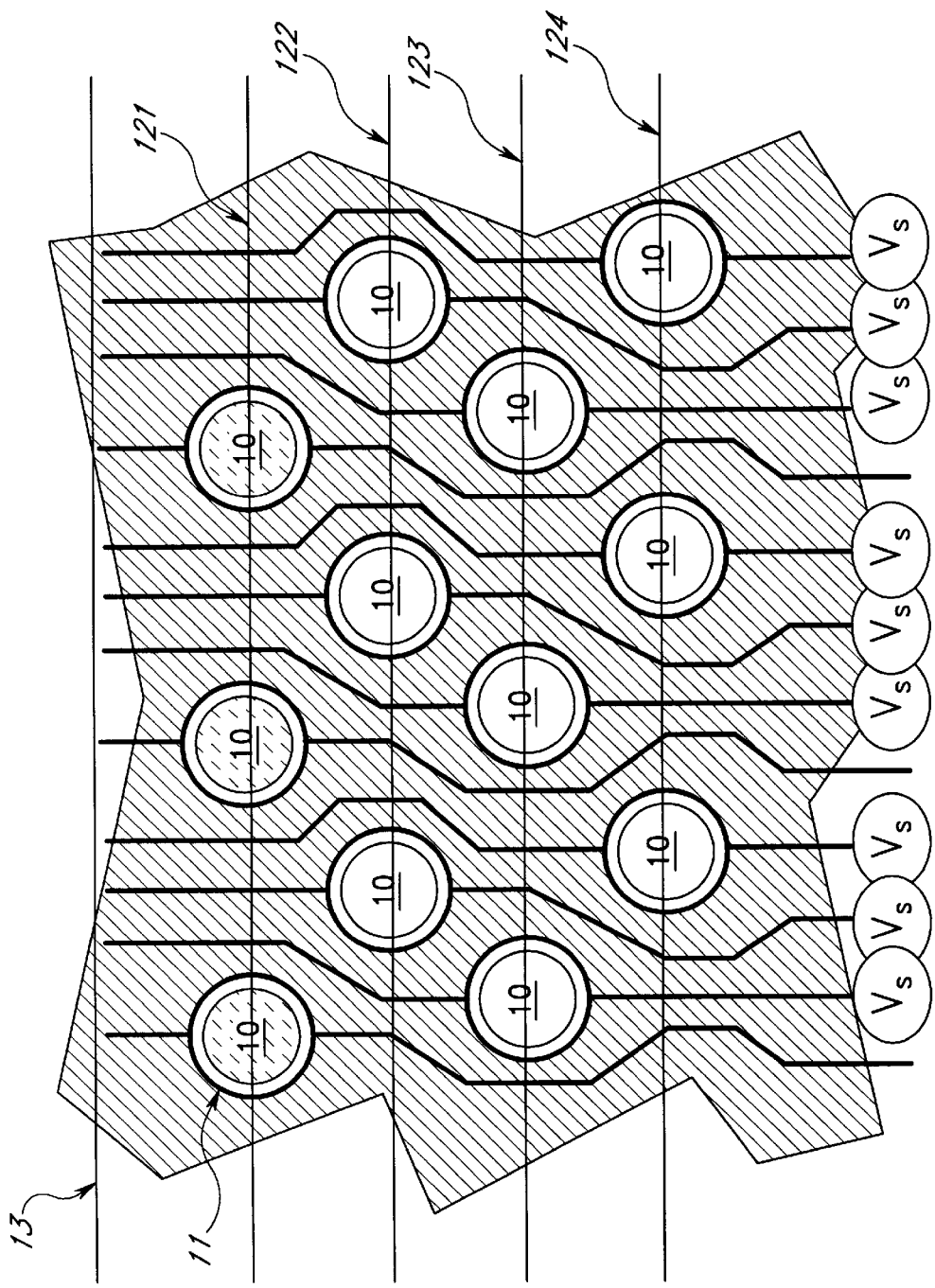
FIG. 10 shows a part of the array of FIG. 2, used in accordance with the embodiment of FIGS. 9a, 9b, 9c and 9d.

FIG. 10 shows a part of the array of FIG. 2, used in accordance with the embodiment of FIGS. 9a, 9b, 9c and 9d during a fourth print period (3T to 4T), as the control voltages are connected to the electrodes of rows 121 while the remaining rows are set to a screen voltage $V_s$.

Figure 11:
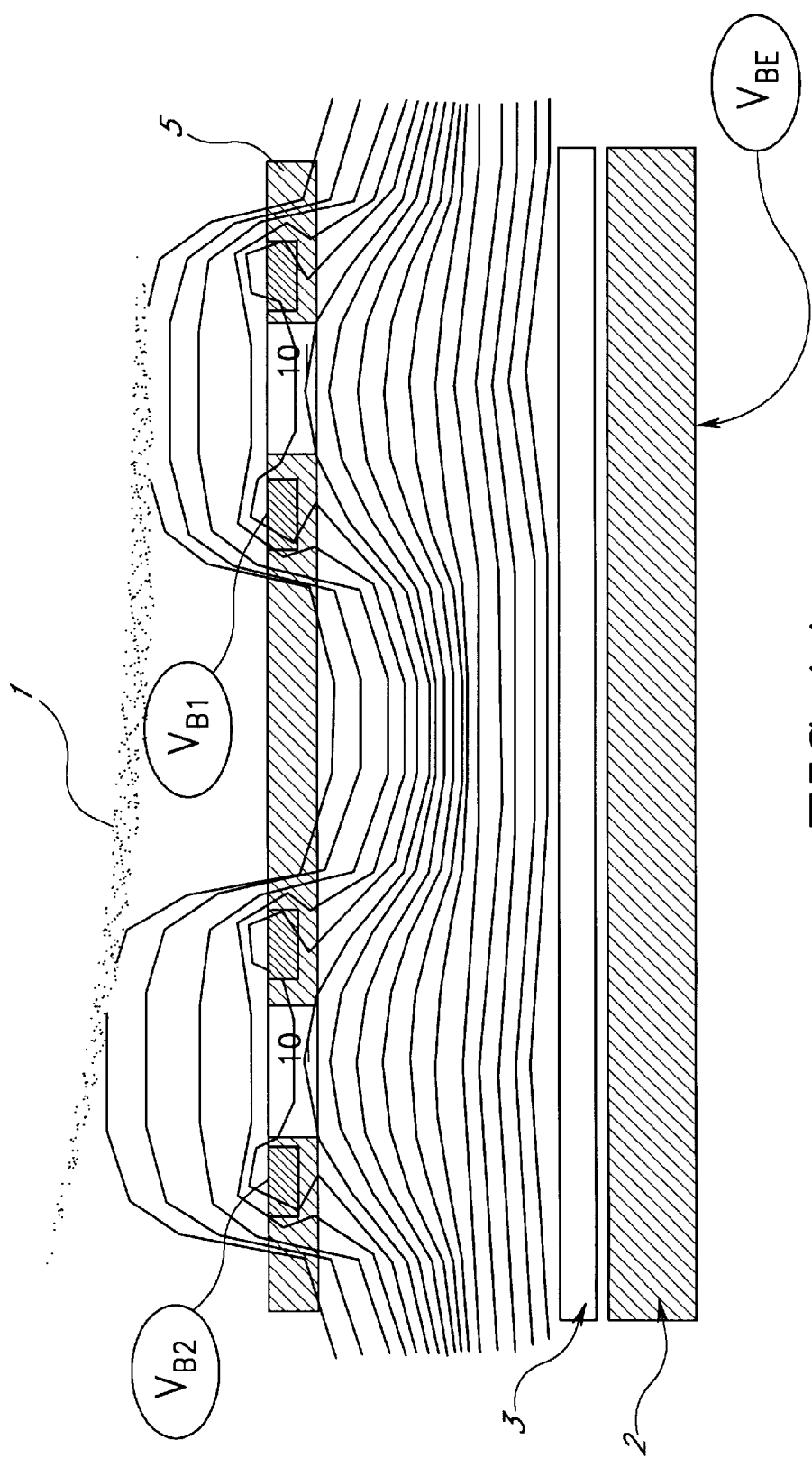
FIG. 11 shows the compensated field in the vicinity of two apertures in adjacent rows of the array.

FIG. 11 shows the field configuration in the vicinity of two apertures of adjacent rows, as both aperture are "opened" by a black voltage $V_b$.

Figure 12:
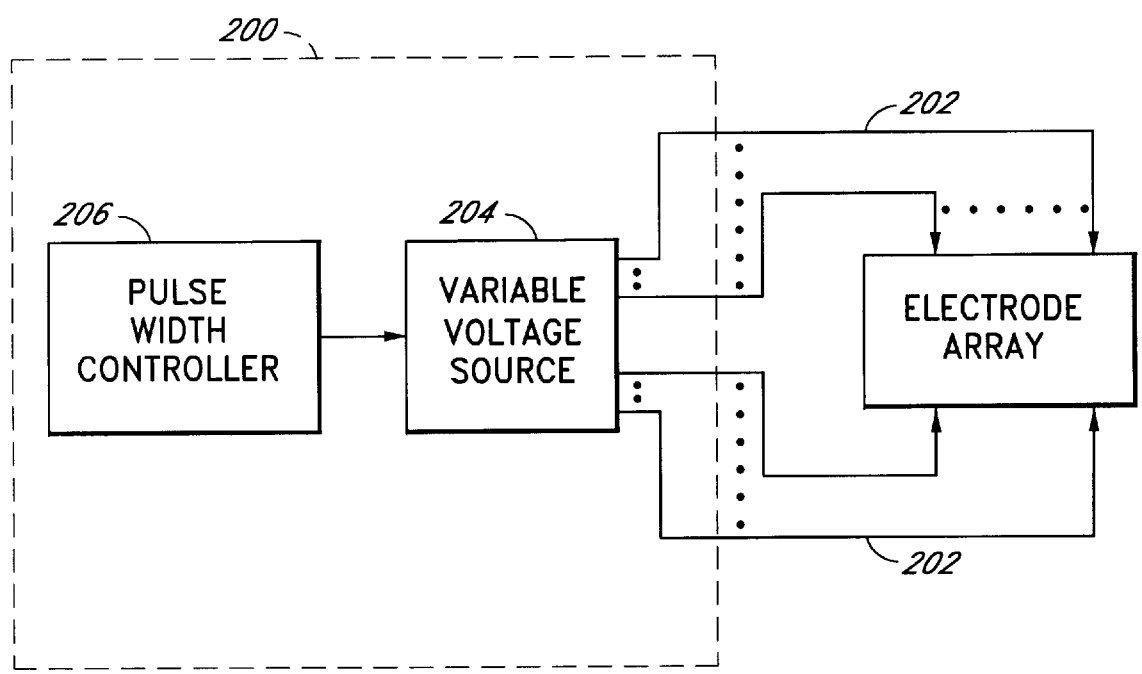
FIG. 12 illustrates a block diagram of an array voltage controller which provides voltage signals to the array electrodes.

FIG. 12 illustrates a block diagram of an array voltage controller 200 which provides voltage signals to the electrodes 11 of the array 7 via a set of lines 202. The controller 200 includes a variable voltage source 204 which provides the voltages in accordance with the selected modulation method of FIGS. 5–8. The controller 200 further includes at least one pulse width controller 206 which controls the pulse widths in accordance with FIGS. 9a, 9b, 9c and 9d.

Typical values for the control voltages, provided that the particles have a negative charge, are in the order of −200 to +600 V, preferably are in the order of −100 to +500 V, and more preferably are in the order of −50 V to +450 V. Typical values for the back electrode voltage $V_{BE}$ is in the order of +1.5 kV. The values given in diagrams 5, 6, 7, 8 or any other feature of the foregoing embodiments are given only as non-exhaustive examples to clarify the basic concept of the present invention.

For instance, the invention is not limited to a symmetrical disposition of the rows about a projection of the rotation axis of the sleeve, as in the foregoing examples. In fact, it can be convenient to position the array axis at a predetermined distance from the projection of the sleeve axis. As the sleeve rotates, the particles are consecutively conveyed to positions adjacent to the different rows, resulting in that the particle supply may decrease from one row to another. To counteract that defect, it can be advantageous to slightly shift the array and the sleeve from one another. In that case, the diagrams of FIGS. 5 to 8 may have a slightly asymmetric shape to adjust the voltage/print time correction.

What is claimed is:

1. A method for improving the print quality of an image recording apparatus in which charged particles are deposited in an image configuration on an information carrier, comprising the steps of:

conveying the charged particles to a particle source located adjacent to a back electrode;

positioning a particle receiving information carrier between the particle source and the back electrode;

providing at least one control array of control electrodes between the particle source and the information carrier, each control electrode being located a respective distance from said particle source;

creating an electric potential difference between the back electrode and the particle source to apply an attractive force on the charged particles;

supplying a respective control signal to each of said control electrodes to produce an electrostatic field about each control electrode to open or close a respective passage between the back electrode and the particle source by influencing said attractive force from the back electrode, thereby selectively permitting or restricting the transport of the charged particles from the particle source and producing an image pattern onto the information carrier; and controlling the transport of the charged particles by selecting a respective voltage level for each control signal supplied to each control electrode in accordance with the respective distance of each control electrode from the particle source.

2. The method as defined in claim 1, wherein the step of controlling the transport of the charged particles further includes the step of selecting a respective pulse width for each control signal supplied to each control electrode, a first pulse width of a first control signal supplied to a first control electrode being greater than a second pulse width of a second control signal supplied to a second control electrode when a first respective distance of said first control electrode from the particle source is greater than a second respective distance of said second control electrode from the particle source.

3. The method as defined in claim 1, wherein said charged particles are toner.

4. The method as defined in claim 1, wherein said particle source is located on a surface of a rotating developer sleeve.

5. The method as defined in claim 1, wherein said control array is formed of a substrate having apertures arranged therethrough, each aperture being at least partially surrounded by a control electrode.

6. The method as defined in claim 5, wherein said apertures are arranged in parallel rows.

7. A method for improving the print quality of an image recording apparatus in which charged particles are deposited in an image configuration on an information carrier, comprising the steps of:

conveying the charged particles to a particle source located adjacent to a back electrode;

positioning a particle receiving information carrier between the particle source and the back electrode;

providing at least one control array of control electrodes between the particle source and the information carrier, each control electrode being located a respective distance from said particle source;

creating an electric potential difference between the back electrode and the particle source to apply an attractive force on the charged particles;

supplying a respective control to each control electrode to produce an electrostatic field about each control electrode to open or close a respective passage between the back electrode and the particle source by influencing said attractive force from the back electrode, thereby selectively permitting or restricting the transport of the charged particles from the particle source and producing an image pattern onto the information carrier; and controlling the transport of the charged particles by selecting a respective pulse width for each control signal supplied to each control electrode, a first pulse width of a first control signal supplied to a first control electrode being greater than a second pulse width of a second control signal supplied to a second control electrode when a first respective distance of said first control electrode from the particle source is greater than a second respective distance of said second control electrode from the particle source.

8. A method for improving the print quality of an image recording apparatus in which charged particles are transported from a particle source and deposited in an image configuration on an information carrier, comprising the steps of:

supplying respective control signals to a plurality of control electrodes, each control signal having a respective voltage level corresponding to an amount of the charged particles to transport from said particle source to said information carrier through a respective passage controlled by a respective control electrode to which said control signal is supplied; and selecting said respective voltage level of each control signal in accordance with a respective distance of each control electrode from said particle source.

9. The method as defined in claim 8, wherein a first voltage level of a first of said control signals supplied to a first of said control electrodes is greater than a second voltage level of a second of said control signals supplied to a second of said control electrodes when said first control electrode is farther from said particle source than said second control electrode.

10. The method as defined in claim 8, wherein said voltage level has any value comprised in a range from −200 V to +600 V.

11. The method as defined in claim 10, wherein said voltage level is preferably in a range from −50 V to +450 V.

12. The method as defined in claim 8, wherein each control signal has a respective pulse width corresponding to the amount of the charged particles to transport from said particle source to said information carrier through each respective passage of each respective control electrode, and wherein a first pulse width of a first of said control signals supplied to a first of said control electrodes is greater than a second pulse width of second of said control signals supplied to a second of said control electrodes when said first control electrode is farther from said particle source than said second control electrode.

13. A method for improving the print quality of an image recording apparatus in which charged particles are transported from a particle source and deposited in an image configuration on an information carrier, comprising the steps of:

supplying control signals to control electrodes, each control signal having a respective pulse width corresponding to an amount of the charged particles to transport from said particle source to said information carrier; and selecting said respective pulse width for each control signal supplied to each control electrode, a first pulse width of a first control signal supplied to a first control electrode being greater than a second pulse width of a second control signal supplied to a second control electrode when a first respective distance of said first control electrode from the particle source is greater than a second respective distance of said second control electrode from the particle source.

14. The method as defined in claim 13, wherein said pulse width has any value comprised in a range from 0 microseconds to 500 microseconds.

15. The method as defined in claim 14, wherein said pulse width is preferably in a range from 100 microseconds to 400 microseconds.

16. A method for improving the print quality of an image recording apparatus in which charged particles are transported from a particle source and deposited in an image configuration on an information carrier, comprising the steps of:

providing a control array of control electrodes arranged in at least two complementary subsets, each subset comprising control electrodes located at a same predetermined distance from said particle source;

performing at least two consecutive print sequences;

during each of each said print sequences, supplying control signals having variable voltage levels to the control electrode of a specific subset; and for each print sequence, selecting a respective voltage level for each control signal supplied to each control electrode in accordance with the predetermined distance related to said specific subset.

17. The method as defined in claim 16, wherein said control signals further have variable pulse widths, and wherein for each print sequence, said pulse width of each control signal is dimensioned as a function of said predetermined distance related to said specific subset.

18. The method as defined in claim 16, wherein said control electrodes are arranged in parallel rows and each of said at least two complementary subsets comprises at least one of said rows.

19. The method as defined in claim 16, wherein said control signals are supplied to the control electrodes of a specific subset, while screen voltages are simultaneously supplied to the remaining control electrodes to prevent electrostatic interaction between the control electrodes of said specific subset.

20. The method as defined in claim 19, wherein said screen voltages produce electrostatic fields acting repelling on charged particles.

21. The method as defined in claim 19, wherein said screen voltages correspond to white voltages used in non-print condition.

22. The method as defined in claim 16, wherein said control electrodes in said at least two complementary subsets are arranged in at least two pairs of rows, each pair of rows of the at least two pairs of rows comprising control electrodes located at a same predetermined distance from the particle source and each print sequence being performed using a specific pair of rows.

23. A method for improving the print quality of an image recording apparatus in which charged particles are transported from a particle source and deposited in an image configuration on an information carrier, comprising the steps of:

provided a control array of control electrodes arranged in at least a first subset and a second subset, each control electrode in said first subset located at a first predetermined distance from said particle source, each control electrode in said second subset located at a second predetermined distance from said particle source;

performing a print sequence;

during said print sequence, supplying a control signal having a respective pulse width to each control electrode of said first subset and each control electrode of said second subset; and for said print sequence, selecting said respective pulse width for each control signal supplied to each control electrode of said first subset and said second subset, wherein a first pulse width of a first control signal supplied to each control electrode of said first subset is greater than a second pulse width of a second control signal supplied to each control electrode of said second subset when said first predetermined distance is greater than said second predetermined distance.

24. An image recording apparatus in which charged particles are deposited in an image configuration on an information carrier, including:

a back electrode;

a particle carrying device conveying the charged particles to a particle source located adjacent to said back electrode;

a particle receiving information carrier positioned between said particle source and said back electrode;

a control array of control electrodes positioned between said particle source and said information carrier;

a back voltage source connected to said back electrode to produce an electric potential difference between said back electrode and said particle source, thereby applying an attractive force on the charged particles;

at least one variable voltage source connected to each of said control electrodes to produce an electrostatic field about said control electrode to at least partially open or close a passage through said control array by influencing said attractive force from the back electrode, thereby permitting or restricting the transport of the charged particles from the particle source and producing an image pattern onto the information carrier; and at least one control device for adjusting the signals generated by each variable voltage source to a predetermined distance between said particle source and the control electrode to which said variable voltage source is connected.

25. The apparatus as defined in claim 24, wherein said control device is a pulse modulation device.

\* \* \* \* \*